(12) United States Patent
Mitchell et al.

(10) Patent No.: US 12,549,578 B2
(45) Date of Patent: Feb. 10, 2026

(54) TIERED REMEDIATION OF OUTLIER DOMAIN NAME SYSTEM REQUESTS

(71) Applicant: HYAS Infosec Inc., Vancouver (CA)

(72) Inventors: David J. Mitchell, Danville, CA (US); Paul C. van Gool, Santa Barbara, CA (US)

(73) Assignee: HYAS Infosec Inc., Vancouver (CA)

( * ) Notice: Subject to any disclaimer, the term of this patent is extended or adjusted under 35 U.S.C. 154(b) by 262 days.

(21) Appl. No.: 18/325,284

(22) Filed: May 30, 2023

(65) Prior Publication Data
US 2024/0406197 A1 Dec. 5, 2024

(51) Int. Cl.
H04L 9/40 (2022.01)

(52) U.S. Cl.
CPC ...... H04L 63/1425 (2013.01); H04L 63/1466 (2013.01)

(58) Field of Classification Search
CPC .............. H04L 63/1425; H04L 63/1466
See application file for complete search history.

(56) References Cited

U.S. PATENT DOCUMENTS

| | | | | |
|---|---|---|---|---|
| 10,122,742 B1* | 11/2018 | Oprea | .............. | H04L 63/1425 |
| 11,930,039 B1* | 3/2024 | Geethakumar | ..... | H04L 63/1416 |
| 12,182,670 B1* | 12/2024 | Beauchesne | ........ | H04L 63/1416 |
| 12,238,127 B1* | 2/2025 | Shivamoggi | ............. | G06F 7/08 |
| 12,261,866 B1* | 3/2025 | Yen | ....................... | H04L 67/306 |
| 12,267,345 B1* | 4/2025 | Erlingsson | ............ | G06F 9/5072 |
| 12,284,197 B1* | 4/2025 | Martin | ................... | H04L 67/306 |
| 2013/0246422 A1* | 9/2013 | Bhargava | ................ | G06F 16/40 |
| | | | | 707/E17.089 |
| 2015/0286704 A1* | 10/2015 | Shyr | ....................... | G06F 16/35 |
| | | | | 707/737 |
| 2016/0373474 A1* | 12/2016 | Sood | ....................... | G06F 21/53 |
| 2018/0054457 A1* | 2/2018 | Fakeri-Tabrizi | .... | H04L 63/1441 |
| 2020/0112571 A1* | 4/2020 | Koral | ....................... | G06N 3/08 |
| 2020/0195669 A1* | 6/2020 | Karasaridis | ............. | H04L 63/10 |
| 2020/0204574 A1* | 6/2020 | Christian | ................ | G06F 18/23 |
| 2020/0287925 A1* | 9/2020 | Wang | .................. | H04L 63/1425 |
| 2021/0266323 A1* | 8/2021 | Jani | ........................ | G06N 20/00 |
| 2021/0365478 A1* | 11/2021 | Mopur | ................ | G06F 18/2433 |
| 2023/0114298 A1* | 4/2023 | Gupta | .................. | H04L 63/145 |
| | | | | 726/22 |
| 2023/0131894 A1* | 4/2023 | Panse | .................. | H04L 61/2521 |
| | | | | 709/245 |
| 2024/0275806 A1* | 8/2024 | Bajpai | .................... | G06N 3/084 |
| 2025/0007938 A1* | 1/2025 | Shivamoggi | ........ | H04L 63/1425 |
| 2025/0054008 A1* | 2/2025 | Cella | ................... | G06N 5/043 |
| 2025/0063063 A1* | 2/2025 | Tishbi | ................. | G06F 16/9024 |
| 2025/0080562 A1* | 3/2025 | Thompson | .......... | H04L 63/1433 |
| 2025/0080569 A1* | 3/2025 | Thompson | .......... | H04L 63/1433 |
| 2025/0103966 A1* | 3/2025 | Beauchesne | ........... | G06N 20/00 |

* cited by examiner

Primary Examiner — Stephen T Gundry

(57) ABSTRACT

The technology disclosed herein enables remediation of outlier DNS requests using tiered remedial actions. In a particular example, a method provides grouping DNS requests into one or more groups based on characteristics of the DNS requests and identifying an outlier request of the DNS requests. The outlier request is one of the DNS requests that is not included in the one or more groups. The method further provides determining a remedial action from tiered remedial actions for the outlier request based on a distance of the outlier request to the one or more groups. The tiered remedial actions correspond to different distances. The method provides performing the remedial action.

18 Claims, 8 Drawing Sheets

| SENS. LEVEL | INVESTIGATE | DNS FW RULE | DEST. FW RULE |
|---|---|---|---|
| HIGH | N/A | 0.75 | 1.5 |
| MEDIUM | 1 | 1.5 | 2 |
| LOW | 1.5 | 2 | 2.5 |

TIERED REMEDIAL ACTION TABLE

TIERED REMEDIATION OF OUTLIER DOMAIN NAME SYSTEM REQUESTS

TECHNICAL BACKGROUND

The Domain Name System (DNS) allows a computing system to contact another computing system over the internet using a domain name rather than using the other system's network address. DNS nameservers receive requests for network addresses associated with domain names and identify network addresses that correspond to the respective domain names. A computing system requesting a domain name resolution uses a network address supplied by a nameserver to contact a destination computing system (e.g., web server) associated with the domain name and having the supplied network address. Typically, the requesting system, or other components of a network in which the requesting system is located, has no reason not to trust the destination computing system. The requesting system can, therefore, proceed to communicate with the destination system. However, it is possible that the destination computing system may be configured for undesirable activity. Even if consequences of that undesirable activity are detected on the requesting system or within the requesting system's network, it may be difficult to find the cause.

SUMMARY

The technology disclosed herein enables remediation of outlier DNS requests using tiered remedial actions. In a particular example, a method provides grouping DNS requests into one or more groups based on characteristics of the DNS requests and identifying an outlier request of the DNS requests. The outlier request is one of the DNS requests that is not included in the one or more groups. The method further provides determining a remedial action from tiered remedial actions for the outlier request based on a distance of the outlier request to the one or more groups. The tiered remedial actions correspond to different distances. The method provides performing the remedial action.

In another example, an apparatus is provided having one or more computer readable storage media and a processing system operatively coupled with the one or more computer readable storage media. Program instructions stored on the one or more computer readable storage media, when read and executed by the processing system, direct the apparatus to perform the steps of the above-recited method.

DETAILED DESCRIPTION

The remediation systems herein monitors and groups DNS requests based on characteristics of the DNS requests. DNS requests that do not fit into a particular group are considered outlier DNS requests. For example, malicious activity may be identified on a computing network. To determine from where the malicious activity initiated, a system administrator may request identification of outlier DNS requests to remediate at least some of the malicious activity stemming from the outlier DNS requests. The actions taken for remediation are dependent on how much of an outlier a given DNS request is. For instance, if the outlier request is just barely outside of a group so as to not be considered part of the group, then the remediation system may inspect the outlier request to determine whether further action is needed. If, however, the outlier request is farther outside of the group, then the remediation system may block network traffic associated with the request. Blocking the network traffic enables the outlier request to be further inspected while preventing further malicious activity that may be caused by the network traffic. An inspection may indicate that the network address supplied in response to an outlier DNS request is assigned to a destination system in a suspicious geographic location or that a nameserver used when resolving the DNS request was not a typical nameserver associated with a domain name in the DNS request (e.g., the domain name may have been hijacked). Depending on the results of the inspection, the remediation system may elect to maintain a rule blocking the network traffic (or create a rule when the inspection was performed prior to blocking traffic). By tiering the remedial actions depending on how far an outlier request is from a group, outlier requests that are near a group can be treated less severely upon detection than those further away from the group. Using tiered remedial actions presumes that closer outliers are less likely to actually be malicious because the outliers' characteristics are more similar to those of DNS requests in the group and are less likely to be associated with malicious activity. In the example above, the closer outlier's lower likelihood of being malicious enabled the remediation system to hold off on creating a rule blocking traffic prior to performing the inspection.

Figure 1:
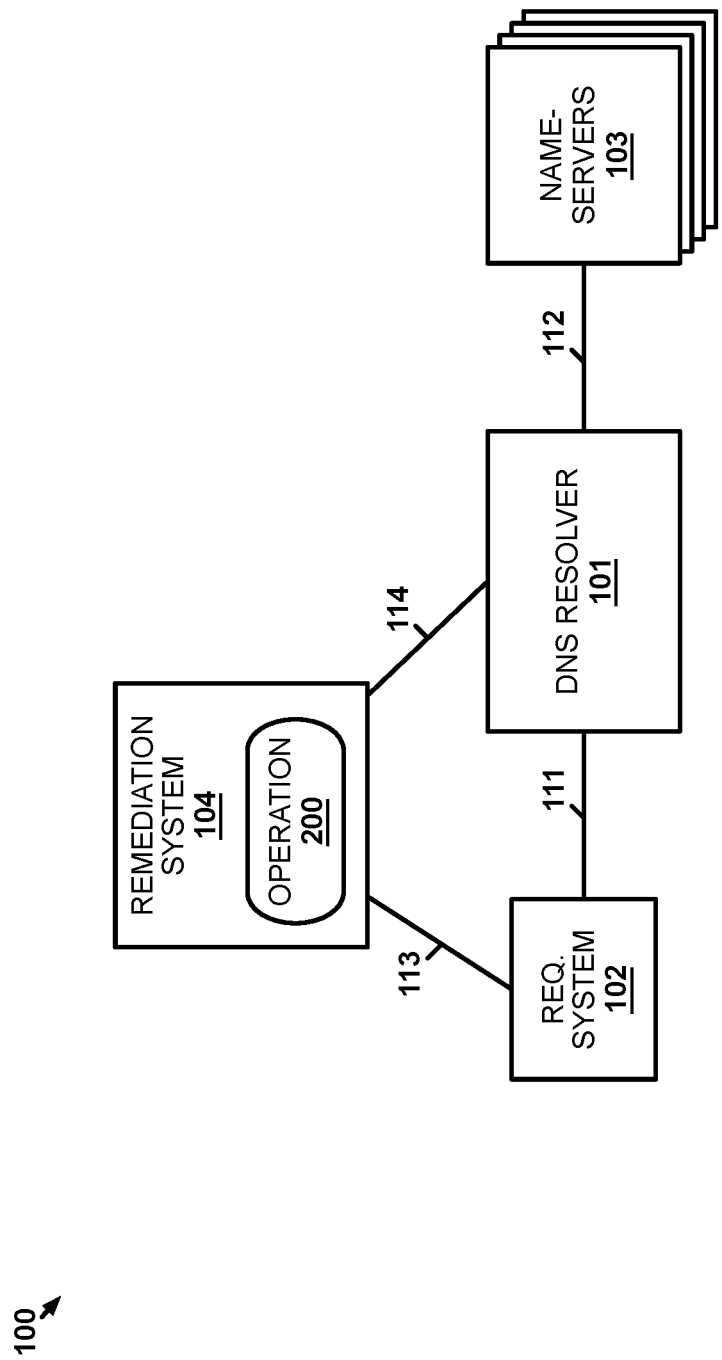
FIG. 1 illustrates an implementation for remediating outlier DNS requests using tiered remedial actions.

FIG. 1 illustrates implementation 100 for remediating outlier DNS requests using tiered remedial actions. Implementation 100 includes DNS resolver 101, requesting system 102, nameservers 103, and remediation system 104. DNS resolver 101 and requesting system 102 communicate over communication link 111. DNS resolver 101 and nameservers 103 communicate over communication links 112. Remediation system 104 and requesting system 102 communicate over communication link 113. Remediation system 104 and DNS resolver 101 communicate over communication link 114. Communication links 111-112 are shown as direct links but may include intervening systems, networks, and/or devices.

In operation, DNS resolver 101 is a computing system that resolves network addresses associated with domain names on behalf of requesting systems, such as requesting system 102. DNS resolver 101 may be positioned in a network so as to service all DNS requests for computing systems in the network or computing systems, regardless of whether they are in the same network, may be otherwise directed to use DNS resolver 101 to resolve DNS requests.

Nameservers 103 are nameservers of the global DNS and include records, commonly referred to as A records, of network addresses associated with respective domain names. For redundancy, at least two of nameservers 103 are typically used to keep network address records for any given domain name. DNS resolver 101 identifies and retrieves a network address from one of the nameservers associated with a domain name in a DNS request to resolve the DNS request and sends a reply to the DNS request with the resolved network address.

In implementation 100, remediation system 104 is communicatively linked to both requesting system 102 and DNS resolver 101 to receive information about DNS requests sent to DNS resolver 101 from requesting system 102. In other examples, remediation system 104 may only receive information from one of systems 101 and 102. Similarly, in some examples, remediation system 104, or a system in communication with remediation system 104, may be placed in the communication path between requesting system 102 and DNS resolver 101 to report information about DNS requests made by requesting system 102 to DNS resolver 101. In further examples, at least a portion of the functionality of remediation system 104 may be incorporated into DNS resolver 101. Remediation system 104 performs operation 200 to group DNS requests, identify outlier requests, and perform remedial actions in response to the outlier requests.

Figure 2:
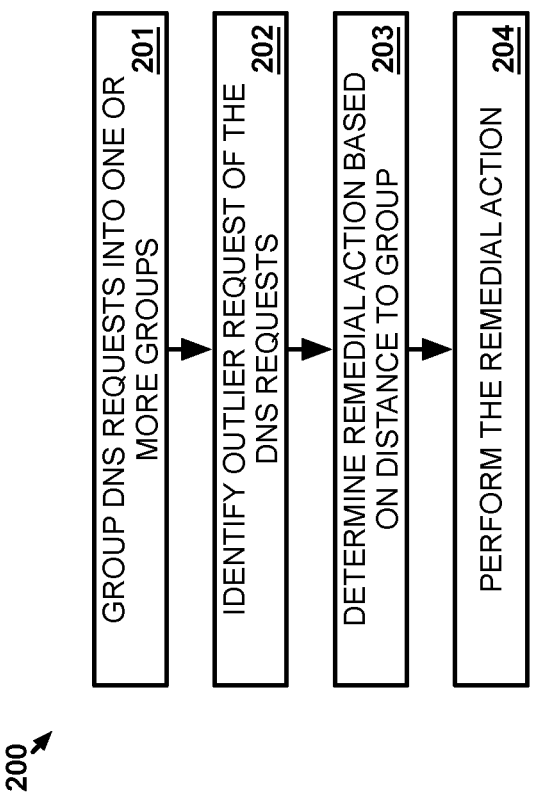
FIG. 2 illustrates an operation to remediate outlier DNS requests using tiered remedial actions.

FIG. 2 illustrates operation 200 to remediate outlier DNS requests using tiered remedial actions. In operation 200, remediation system 104 groups DNS requests into one or more groups based on characteristics of the DNS requests (201). The DNS requests in this example are received from requesting system 102. However, remediation system 104 may include DNS requests from other requesting systems in other examples. A DNS request includes a domain name for which requesting system 102 is requesting a corresponding network address. Requesting system 102 may be a user system (e.g., telephone, laptop, personal computer, tablet computer, or some other type of user operable computing system), a server, or may be another type of physical or virtualized computing system capable of using DNS requests to request network addresses associated with domain names. The DNS request may be transmitted to DNS resolver 101 in response to a user of requesting system 102 directing a web browser application executing on requesting system 102 to a particular website using a domain name for that website (e.g., the user may enter a Uniform Resource Locator (URL) with the domain name into the web browser). Although, other reasons that requesting system 102 may submit a DNS request also exist (e.g., a database system may be identified to an application on requesting system 102 using a URL with a domain name).

Remediation system 104 may receive information indicating DNS request characteristics from either or both of requesting system 102 and DNS resolver 101 (or some other system with access to the information). The characteristics of a DNS request include one or more characteristics describing, or including information associated with, the request or a response thereto from nameservers 103. The characteristics may include a network address of a nameserver to which DNS resolver 101 directs the DNS request. In some examples, multiple nameservers will be used (e.g., different levels of nameservers may need to be traversed to resolve the destination network address requested by the DNS request) and network addresses for any or all of those nameservers may be included in the characteristics. The characteristics may further include a geographic location(s) (e.g., country, region, state, city, etc.) of a nameserver(s) having the network address(es) described above, a network address of requesting system 102 that generated the DNS request, a domain name indicated by the DNS request for resolution into a destination network address by nameservers 103, the destination network address resolved by nameservers 103 in response to the DNS request, a geographic location of a system having the destination network address, or some other type of information related to the DNS request including combinations thereof. The characteristics may be stored by remediation system 104 with an indication of with which DNS request the characteristics are associated so that the particular DNS request having the characteristics can be identified later. Similarly, remediation system 104 may store a copy of the actual request and/or response thereto.

In some examples, remediation system 104 may generate a score for each of the DNS requests from the characteristics of the DNS requests. The DNS requests may then be grouped in accordance with their scores. A score may be an aggregation (e.g., a sum, average, or other type of combination) of arbitrary values given to different characteristics. For instance, one geographic region may be assigned one arbitrary value while another region may be assigned a different arbitrary value. While the value itself may be arbitrary, the fact that the values are different enables the score for a DNS request associated with one region to differ from (and, therefore, not necessarily be grouped with) the score for a DNS request associated with another region. In some examples, the values assigned to certain characteristics may differ (e.g., be weighted differently) depending on the nature of the characteristic. Again using geographic regions as an example, geographic regions that are less known for malicious activity stem therefrom may receive a low value for inclusion in the score (and different regions may be assigned the same value) while regions know for more malicious activity may receive higher score values (e.g., with a most risky region being assigned the highest value). In some examples, the score may start at a particular value and then that starting value may be added to or subtracted from by the values assigned to each of the characteristics. In such examples, the values may be negative. The values that should be assigned to each characteristic may be defined by a human administrator, may be defaults included in remediation system 104, may be determined by a machine learning algorithm, or may be provided in some other manner including combinations thereof. In some examples, two or more scores may be generated for a single DNS request. For example, a first score may be generated based on characteristics related to the DNS request itself and a second score may re generated based on characteristics related to a response to the DNS request. Of course other conventions for divvying up which characteristics should be included in which score may be used instead. Multiple scores enables the DNS request to be plotted over multiple axis when being grouped with other DNS requests based on the scores.

Remediation system 104 may limit the number of DNS requests that are considered for grouping based on a specified timeframe (e.g., DNS requests that were handled over a particular two day period). The timeframe may be specified by an administrative user or may be received from some other source. For instance, an administrator may determine that undesirable activity has been detected within a network/systems served by DNS resolver 101. The administrator may determine that the activity likely started during a particular timeframe (e.g., a firewall may report that anomalous activity started in the timeframe). The administrator may then query remediation system 104 to group DNS requests during the timeframe to identify any outliers that should be subject to further inspection. As such, remediation system 104 tracks when each of the DNS requests are handled and, in some examples, the time may be included in the characteristics upon which the scores are determined. Remediation system 104 may apply one or more thresholds to the scores to determine whether a DNS request should be considered part of a group or considered an outlier. For example, a threshold may indicate that all scores with a less than 5% difference should be considered a group. In some examples, different threshold may be used depending on the device making the request (e.g., the specific device or device type, such as server, personal computer, smartphone, etc.) and the sensitivity of that device to malicious activity (e.g., the affect malicious activity on the device may have on other devices or on operations of an entity for which the device is operating). For instance, if requesting system 102 is a critical system for some aspect of a business, then the threshold for whether a request is considered an outlier may be lower than if requesting system 102 was a less important system. A machine learning algorithm may also be trained to recognize grouped requests. For instance, example scores may be plotted for a user and the user may indicate which scores should be grouped to the algorithm and the algorithm may learn how to group from the user's indications.

Remediation system 104 identifies an outlier request of the DNS requests (202). The outlier request is one of the DNS requests that is not included in the one or more groups. The outlier request may be determined based on the outlier request being located outside of a threshold distance from a nearest group or a group that is otherwise determined to be associated with the request (e.g., is a request for a common domain name with the group). The threshold distance may indicate a distance measured from a center of a group of already grouped requests when graphed by score, may be a distance measured from a particular DNS request in the group (e.g., the nearest DNS request in the group), or be another defined distance. The distance may be a score value (e.g., if the score can be a number between 0 and 10, then the distance may be 1.5) or may be defined in a relative manner (e.g., the 5% difference in scores from the example above). As noted above, in some examples, the threshold distance may depend on the device making the request and the sensitivity of that device to malicious activity. If requesting system 102 is a sensitive device (e.g., an application server may be considered more sensitive than an individual user terminal), then the threshold may be such that a DNS request is more likely to be determined to be an outlier than if requesting system 102 was a less sensitive device. It should be understood that the threshold could be defined from different perspectives (i.e., satisfaction of the threshold may indicate when a DNS request is an outlier or satisfaction may indicate when a DNS request is part of a group).

Remediation system 104 determines a remedial action from tiered remedial actions for the outlier request based on a distance of the outlier request to the one or more groups (203). The remedial action may be an inspection (e.g., investigation of the request and its effects), a firewall rule, a process termination, a process removal, or some other action that may go towards remedying unwanted activity. In general, the farther an outlier request is from a group in which it is associated (e.g., the nearest group, a group of DNS requests for the same domain name, or otherwise), the more severe the remedial action will be because an outlier that is further away from a group is more likely to be associated with malicious activity. The action is more severe in the sense that the action has a greater affect on the operation of requesting system 102 or other systems associated therewith (e.g., other systems operating on the same local network). For example, the least severe remedial action (i.e., the action for an outlier request closest to a group) may be performing an investigation into the outlier request before performing other potential remedial actions. In that case, operations of requesting system 102 and other potentially affected systems will continue as though no outlier was detected. However, for a outlier request that is further away from the group, the remedial action may include creating a firewall rule that blocks traffic associated with the outlier request (e.g., traffic exchanged with a network address provided in response to the outlier request), which affects the operation of requesting system 102 if the traffic was being exchanged with requesting system 102. An inspection may also be performed as part of the more severe action and the result of the inspection may indicate whether the rule should remain or be removed (e.g., indicates whether the outlier request was associated with malicious activity). Additional tiers of remedial actions may also be included. For instance, a firewall rule for a further outlier may be stricter than a firewall rule that is closer (e.g., a firewall rule for a further distance outlier may block traffic to every system behind the firewall while a firewall rule for a closer distance outlier may block only traffic to requesting system 102).

Two or more threshold distances may be predefined that correspond to respective tiers of remedial actions. Similar to the thresholds used to determine whether a DNS request is part of a group, the threshold distances here may indicate a distance measured to a center of a group, may be a distance measured to a particular DNS request in the group (e.g., the nearest DNS request in the group), or be another defined distance. Likewise, different thresholds and corresponding remedial actions may be used depending on the device making the request and the sensitivity of that device to malicious activity. For example, remediation system 104 may select a set of thresholds and remedial actions based on requesting system 102 (e.g., based on the specific device or device type). If requesting system 102 is a critical device to the operation of an application or business, then the thresholds for selecting a more severe remedial action may be shorter than if requesting system 102 was not as critical.

Once the remedial action is selected, remediation system 104 performs the remedial action (204). Remediation system 104 may involve other systems to perform the remedial action. For instance, remediation system 104 may communicate with one or more firewalls to implement a firewall rule when a firewall rule is determined to be included in the remedial action. Similarly, if investigating the outlier request is included in the remedial action, remediation system 104 may collect information from other systems (e.g., firewalls, routers, requesting system 102, other systems connected to requesting system 102, etc.) to perform a thorough investigation. In response to results of an investigation, remediation system 104 may perform further remedial action. For example, if a firewall rule was not implemented initially because of the distance of an outlier request corresponding to a lower severity tier, then the results may indicate that a rule should now be implemented and remediation system 104 may do so. In some examples, remediation system 104 may report to a user about the remedial action that took place, may report the results of an investigation, or may provide some other information about remediation system 104's actions to the user. Advantageously, having tiered remedial actions recognizes that a single remedial action may not be best in every situation and enables different actions that are better suited for the particular circumstances (i.e., depending on how far an outlier is from a group).

Figure 3:
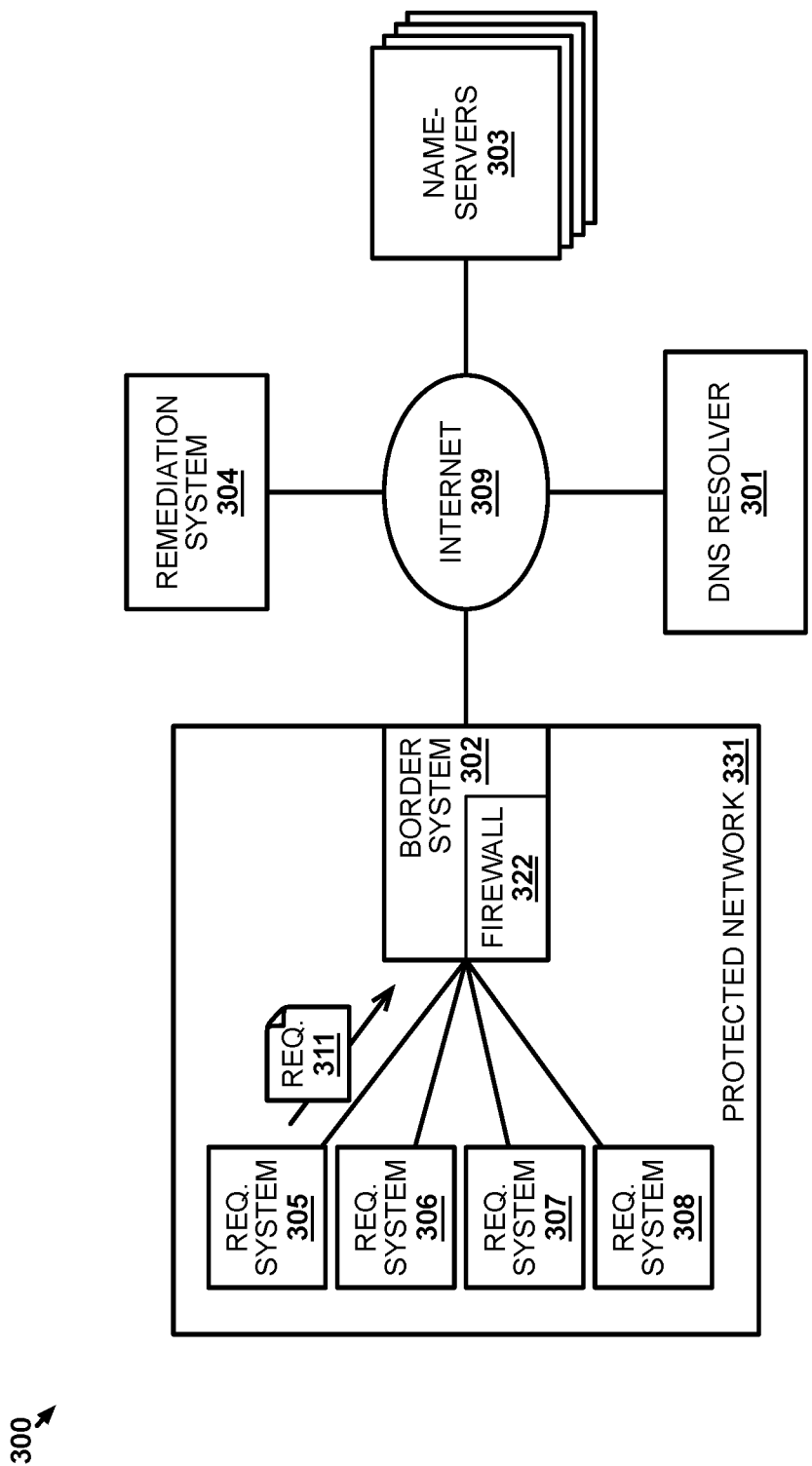
FIG. 3 illustrates an implementation for remediating outlier DNS requests using tiered remedial actions.

FIG. 3 illustrates implementation 300 for remediating outlier DNS requests using tiered remedial actions. Implementation 300 includes DNS resolver 301, border system 302, nameservers 303, remediation system 304, requesting systems 305-308, and internet 309. Requesting systems 305-308 are part of protected network 331, which may include switches, routers, and other devices/systems that are not shown. Network traffic into and out of protected network 331 passes through border system 302. Other examples may include multiple border systems like border system 302 that operate in a similar manner (e.g., protected network 331 may be spread across multiple physical locations and/or may require additional border systems for redundancy or traffic load considerations). In this example, border system 302 includes firewall 322 to regulate network traffic passing through border system 302. Protected network 331 may be operated by an entity that configured protected network 331 to be protected by remediation system 304 as described below. Since remediation system 304 is not located within protected network 331, remediation system 304 may implement a cloud-based protection service over internet 309 and may serve other protected networks in addition to protected network 331.

In operation, border system 302 monitors network traffic for DNS requests sent from requesting systems 305-308 to DNS resolver 301 and replies to the DNS requests sent from DNS resolver 301 after DNS resolver 301 resolves the DNS requests using nameservers 303. Border system 302 sends information about the DNS requests and corresponding replies to remediation system 304 so remediation system 304 can take remedial actions to protect against potential issues stemming from outlier DNS requests.

Figure 4:
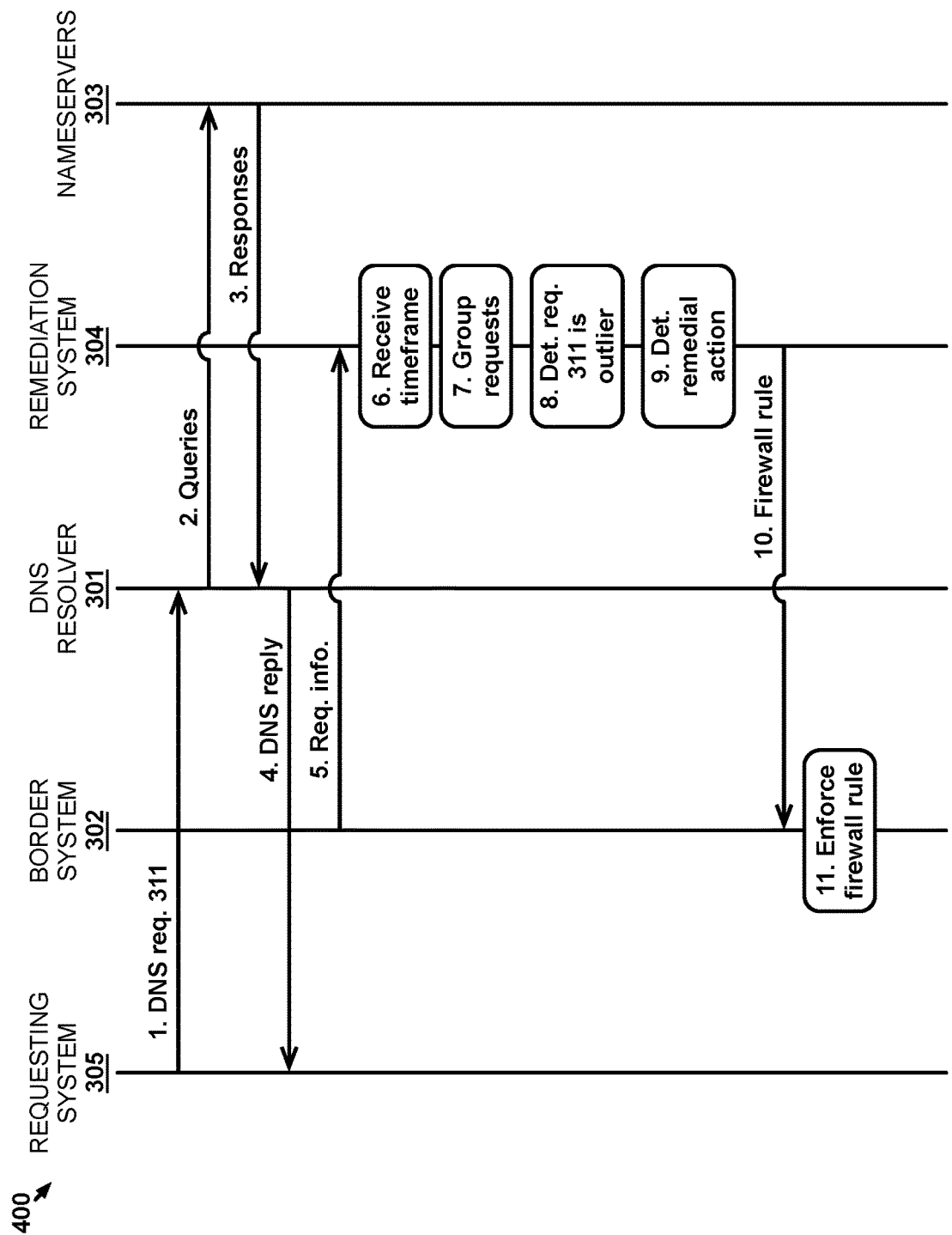
FIG. 4 illustrates an operational scenario for remediating outlier DNS requests using tiered remedial actions.

FIG. 4 illustrates operational scenario 400 for remediating outlier DNS requests using tiered remedial actions. Operational scenario 400 is an example following one DNS request from requesting system 305, DNS request 311, which is determined to be an outlier request. DNS request 311 transmits DNS request 311 to DNS resolver 301 at step 1 through border system 302. DNS request 311 may be initiated by a user of requesting system 305 (e.g., the user navigating to a website) or may be initiated by requesting system 305 automatically (e.g., a process on requesting system 305 may communicate with other systems over internet 309 and those other systems may use domain name addresses). In response to receiving DNS request 311, DNS resolver 301 resolves the request (i.e., identifies an Internet Protocol (IP) address associated with a domain name in DNS request 311) by querying one or more of nameservers 303 at step 2 and receiving responses to those queries at step 3. When DNS resolver 301 has resolved the domain name into the IP address, DNS resolver 301 transmits a reply including the IP address at step 4 to requesting system 305.

Requesting system 305 transmits information about DNS request 311 (including information about the reply to DNS request 311) at step 5 to remediation system 304. Remediation system 304 stores the information about DNS request 311. The information about DNS request 311 indicates the characteristics of DNS request 311 that remediation system 304 uses to generate a score for DNS request 311. Remediation system 304 may generate the score immediately upon receiving the information or may wait until a score is needed to group DNS request 311 with other DNS requests from requesting systems 305-308 about which border system 302 transmitted similar information. In some examples, DNS resolver 301 may transmit at least a portion of the information to DNS resolver 301. For instance, the information about DNS request 311 may include IP addresses or geographic locations of one or more of nameservers 303 used to resolve DNS request 311. Border system 302 may not be privy to that portion of the information and remediation system 304 may, therefore, receive the information from DNS resolver 301 or another system aware of the information.

In this example, remediation system 304 receives a timeframe at step 6. The timeframe could be any period of time in which DNS requests may have been handled by border system 302. In some cases, the timeframe may not be contiguous (e.g., the timeframe may include only nighttime hours over the course of a week). In this example, the timeframe is a timeframe that a user (e.g., an administrator of protected network 331) has determined to be of interest. For instance, the user may have identified anomalous or malicious activity within protected network 331 and, based on characteristics of that activity, may estimate a period of time in which the malicious activity was likely to have been initiated. The timeframe may be selected by the user to include that estimated period of time. In other examples, remediation system 304 may operate using a predefined timeframe, which may be a rolling timeframe (e.g., may constantly monitor the most recent predefined amount of time, such as the last two days), or may automatically determine a timeframe (e.g., an antivirus process may detect malicious activity and remediation system 304 may determine the timeframe to be the time from a previous running of the process till the time when the process detected the activity).

Remediation system 304 groups DNS requests that occurred within the timeframe at step 7. In this example, remediation system 304 groups the DNS requests based on the scores generated for the requests. The scores may have been generated when information about the requests is received by remediation system 304 or remediation system 304 may generate the scores upon determining that the requests occurred within the timeframe. The groups may be determined based on the scores of DNS requests being within a specified threshold of one another, as discussed above. Any DNS request that does not fit into a group is considered an outlier. In some examples, even if a small number of requests have scores that group them together (e.g., 2 or 3 requests), those requests may not be considered within a separate group. Rather, the few requests may be considered outliers to another group based on the requests having a common characteristic that affects their score to set them apart from the group.

In this example, remediation system 304 determines that DNS request 311 is an outlier request at step 8. In response to the determination that DNS request 311 is an outlier, remediation system 304 determines a remedial action to take with respect to DNS request 311 at step 9. The remedial action is determined based on a distance of the score of DNS request 311 from the scores of the group from which DNS request 311 is an outlier. The distance corresponds to one of two or more possible tiered remedial actions. Distance thresholds may correspond to the tiers of remedial actions to define which remedial action corresponds to which distances. In this case, remediation system 304 determines that a firewall rule should be created to block network traffic associated with DNS request 311 (e.g., network traffic to/from an IP address received in the reply to DNS request 311, network traffic including a DNS request for the same domain name as DNS request 311, and/or some other type of network traffic).

Remediation system 304 generates the firewall rule and transmits the firewall rule to border system 302 at step 10. The firewall rule as generated by remediation system 304 may already be formatted as required by firewall 322 (e.g., may be sent as a file with the rule) or DNS resolver 301 may instruct border system 302 or firewall 322 on the desired parameters for the firewall rule. Upon receiving the firewall rule, firewall 322 enforces the firewall rule at step 11 in border system 302.

Figure 5:
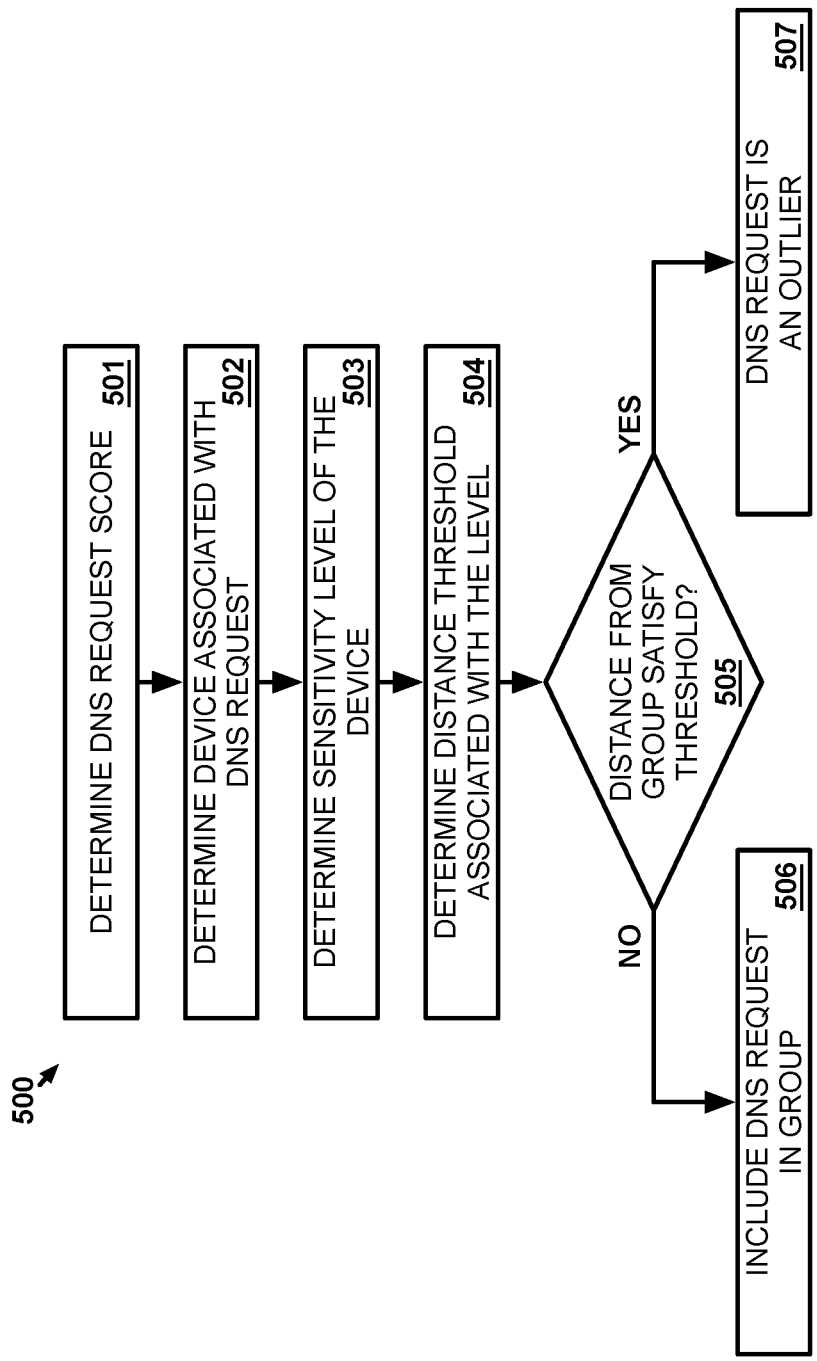
FIG. 5 illustrates an operation to remediate outlier DNS requests using tiered remedial actions

FIG. 5 illustrates operation 500 to remediate outlier DNS requests using tiered remedial actions. Operation 500 is an example of how remediation system 304 may perform steps 7 and 8 of operational scenario 400. In operation 500, remediation system 304 determines whether a DNS request is placed in a group or is an outlier. For a DNS request being grouped, remediation system 304 determines a score from the characteristics of the DNS request (501). Remediation system 304 further determines a device associated with the DNS request (502). Remediation system 304 may query the device that made the DNS request using a source IP address of the DNS request, may reference a data structure storing device information (e.g., IP addresses and corresponding device information), or may identify the device in some other manner. Remediation system 304 may be concerned with the specific device (e.g., the specific model, processes executing thereon, user of the device, etc.), the type of device (e.g., application server, web server, personal computer, etc.), a business unit associated with the device, or some other identifying characteristic of the device including combinations thereof.

After determining the device, remediation system 304 determines a sensitivity level of the device (503). The sensitivity level of the device is representative of how malicious activity at the device may affect the operation of protected network 331 either directly (e.g., by causing issues with operation of the device itself) or indirectly (e.g., by infecting other devices on protected network 331, such as one of requesting systems 305-308). Remediation system 304 may include predefined sensitivity levels for devices it may encounter and, therefore, may simply reference those predefined sensitivity levels. Although, other manners of determining a sensitivity level may be used. Remediation system 304 then determines a distance threshold associated with the determined sensitivity level (504). In general, the more sensitive a device is (i.e., the higher the sensitivity level of the device), the shorter the threshold distance will be. For example, there may be five discrete sensitivity levels and five corresponding thresholds with the highest sensitivity level corresponding to the shortest threshold and the lowest sensitivity level corresponding to the longest threshold.

Remediation system 304 determines whether the distance the DNS request is from the group satisfies the determined distance threshold (505). The distance may be measured from a determined center of the DNS requests already in the group, may be measured from a nearest DNS request already in the group, or may be measured from some other defined location associated with the group. If the DNS request does not satisfy the threshold (i.e., the score of DNS request is within the threshold distance), then remediation system 304 includes the DNS request in the group (506). If, however, the DNS request satisfies the threshold (i.e., is beyond the threshold distance), then remediation system 304 determines the DNS request is an outlier and does not include the DNS request in the group (507).

Figure 6:
FIG. 6 illustrates a table of remedial action tiers for remediating outlier DNS requests using tiered remedial actions.

FIG. 6 illustrates table 600 of remedial action tiers for remediating outlier DNS requests using tiered remedial actions. Table 600 is an example of what remediation system 304 may use to determine the remedial action at step 9 of operational scenario 400 based on the sensitivity level determined in operation 500. In particular, table 600 indicates three possible sensitivity levels for a device: high, medium, and low. Table 600 further indicates three remedial actions that may be taken (i.e., three tiers of remedial actions). Investigation of the DNS request is the lowest severity action and implementing a firewall rule to block network traffic exchanged with an IP address of a destination identified in a reply to the DNS request is the most severe action. Creating a firewall rule blocking DNS requests for the same domain name as an outlier request is of a severity between the other two.

Table 600 further defines the threshold distances corresponding to each action depending on the sensitivity level of the device. The distance values are merely examples to show the relative differences between each level. For example, a DNS request for a low sensitivity device would need to be at least 1.5 score units away from the group for remediation system 304 to investigate the DNS request. If the distance reaches 2, then a firewall rule blocking requests for the domain name is created and, if the distance reaches 2.5, then a firewall rule blocking traffic to the destination is created. In this example, the remedial action includes all actions with satisfied thresholds so creating a destination blocking firewall rule would also create the DNS request firewall rule and trigger an investigation. Other examples, may perform only the action corresponding to the longest threshold satisfied. Additionally, the threshold distances for a particular remedial action are reduced as the sensitivity level of a device increases.

In table 600, the high sensitivity level does not include an investigate only threshold. As such, the lowest threshold met at least creates a DNS request blocking firewall rule in addition to performing an investigation. This may be the case because high sensitivity devices may benefit from being overly cautious with remedial actions. Of course, alternative logic for defining thresholds may also be used. For instance, an administrator may prefer for an important device to continue operating as is until an investigation is performed to avoid a firewall rule adversely affecting its performance.

Figure 7:
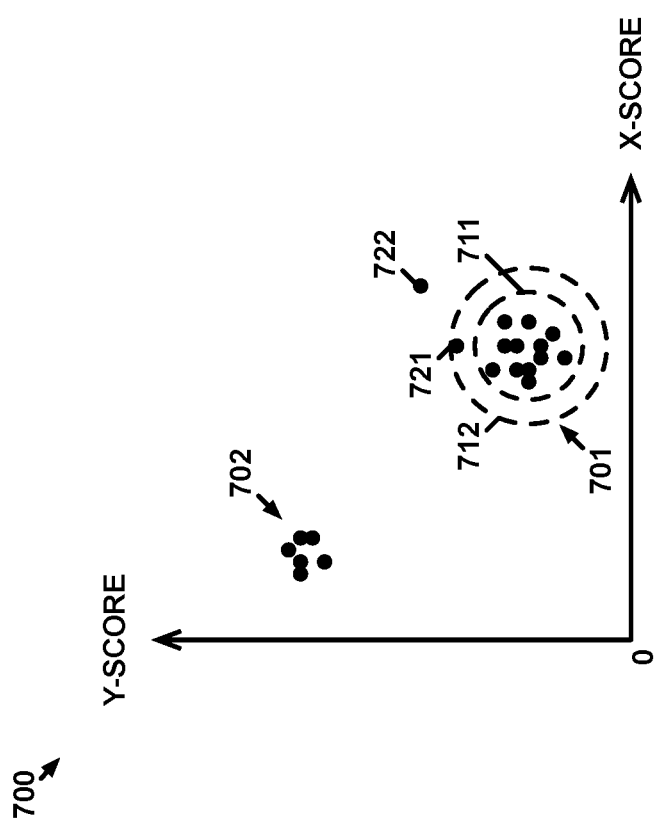
FIG. 7 illustrates a graph of DNS requests to remediate outlier DNS requests using tiered remedial actions.

FIG. 7 illustrates graph 700 of DNS requests to remediate outlier DNS requests using tiered remedial actions. Graph 700 is an example of how scores for DNS requests in operational scenario 400 would look if plotted. In this example, two scores, an X-score and a Y-score in accordance with their respective axes, are determined for each DNS request (e.g., one portion of the characteristics may be used to generate the X-score while another portion of the characteristics may be used to generate the Y-score). The scores both start at 0 and increase from there, although, other examples may allow for negative scores. Each DNS request (represented by a dot) is plotted on graph 422 in the position that corresponds to both of the request's scores. As shown, remediation system 304 determined that most of the DNS requests in the specified timeframe fall within group 701 and group 702.

In one example, distance threshold 711 and distance threshold 712 are distance thresholds defining how far a score of a DNS request may be from the group for inclusion in the group. Specifically, distance threshold 712 may apply to lower sensitivity devices and distance threshold 711 may apply to higher sensitivity devices. Distance threshold 711 causes both DNS request 721 and DNS request 722 to be excluded from the group and be designated as outliers. However, if the device of DNS request 721 is of a lower sensitivity, then distance threshold 712 applies and DNS request 721 is included in the group while DNS request 722 is still excluded as an outlier.

In another example, distance threshold 711 and distance threshold 712 may be distance thresholds corresponding to different remedial action tiers. For instance, distance threshold 711 may correspond to investigating a DNS request and distance threshold 712 may correspond to creating a firewall rule. As such, assuming DNS request 721 and DNS request 722 are both determined to be outliers (and of the same sensitivity level), then remediation system 304 will investigate DNS request 721 (i.e., because DNS request 721 is outside of distance threshold 711 and inside of distance threshold 712) and will create a firewall rule for DNS request 722 (i.e., because DNS request 722 is outside of distance threshold 712). Since DNS request 722 is also outside of distance threshold 711, remediation system 304 may also investigate DNS request 722.

Figure 8:
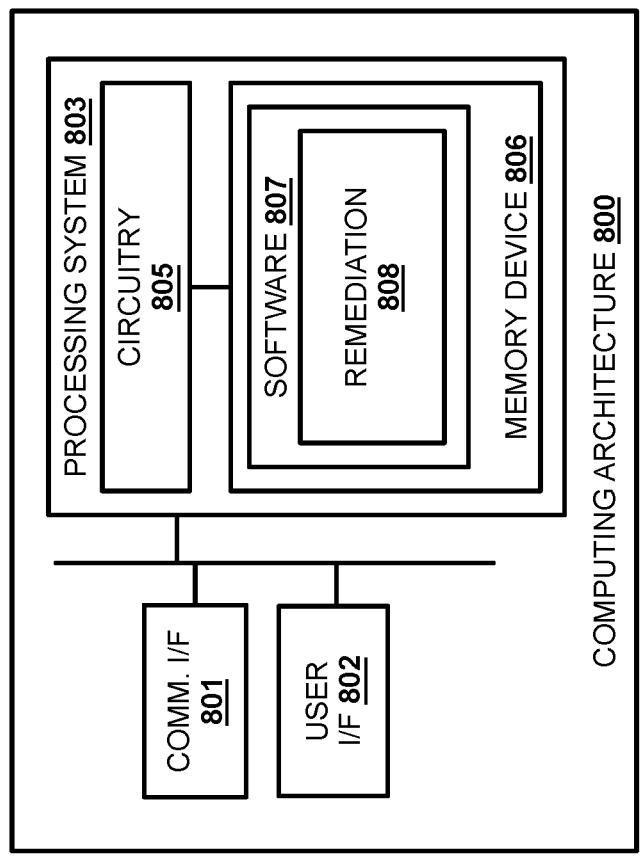
FIG. 8 illustrates a computing architecture for remediating outlier DNS requests using tiered remedial actions.

FIG. 8 illustrates computing architecture 800 for remediating outlier DNS requests using tiered remedial actions. Computing architecture 800 is an example computing architecture for remediation system 104 and remediation system 304, although systems 104 and 304 may use alternative configurations. A similar architecture may also be used for other systems described herein (e.g., requesting systems, DNS resolvers, border system, nameservers, etc.), although alternative configurations for those systems may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 includes remediation module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, remediation module 808 directs processing system 803 to group DNS requests into one or more groups based on characteristics of the DNS requests and identify an outlier request of the DNS requests. The outlier request is one of the DNS requests that is not included in the one or more groups. Remediation module 808 further directs processing system 803 to determine a remedial action from tiered remedial actions for the outlier request based on a distance of the outlier request to the one or more groups. The tiered remedial actions correspond to different distances. Remediation module 808 directs processing system 803 to performing the remedial action.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   grouping DNS requests into one or more groups based on characteristics of the DNS requests;
   identifying an outlier request of the DNS requests, wherein the outlier request is one of the DNS requests that is not included in the one or more groups; and
   determining a remedial action from tiered remedial actions for the outlier request based on a distance of the outlier request to the one or more groups, wherein the tiered remedial actions correspond to different distances, wherein the tiered remedial actions include a first remedial action including blocking traffic associated with the outlier request and a second remedial action including investigating the outlier request, and wherein the first remedial action corresponds to a first distance that is longer than a second distance to which the second remedial action corresponds; and
   performing the remedial action.

2. The method of claim 1, wherein identifying the outlier request comprises:
   determining a device associated with the outlier request; and
   determining a distance threshold associated with the device from device-specific distance thresholds indicating whether a DNS request is an outlier; and
   determining that the distance satisfies the distance threshold.

3. The method of claim 2, wherein determining the distance threshold comprises:
   determining a sensitivity level for the device; and
   determining the distance threshold based on the sensitivity level, wherein distance thresholds of the device-specific distance thresholds are shorter for higher sensitivity levels.

4. The method of claim 1, comprising:
   determining a device associated with the outlier request; and
   selecting the tiered remedial actions from device-specific tiered remedial actions based on the device.

5. The method of claim 4, wherein selecting the tiered remedial actions comprises:
    determining a sensitivity level for the device; and
    determining the tiered remedial actions based on the sensitivity level.

6. The method of claim 1, wherein grouping the DNS requests comprises:
    generating scores for the DNS requests from the characteristics; and
    grouping the DNS requests into the one or more groups based on the scores.

7. The method of claim 6, wherein the distance comprises a difference between a score of the outlier request and a score of a group of the one or more groups.

8. An apparatus comprising:
    one or more computer readable storage media;
    a processing system operatively coupled with the one or more computer readable storage media; and
    program instructions stored on the one or more computer readable storage media that, when read and executed by the processing system, direct the apparatus to:
        group DNS requests into one or more groups based on characteristics of the DNS requests;
        determine a device associated with a first DNS request of the DNS requests;
        determine a distance threshold associated with the device from device-specific distance thresholds indicating whether a DNS request is an outlier not included in the one or more groups;
        in response to determining that a distance of the first DNS request to the one or more groups satisfies the distance threshold, identify the first DNS request as being an outlier request of the DNS requests;
        determine a remedial action from tiered remedial actions for the outlier request based on the distance, wherein the tiered remedial actions correspond to different distances; and
        perform the remedial action.

9. The apparatus of claim 8, wherein the tiered remedial actions include a first remedial action including blocking traffic associated with the outlier request and a second remedial action including investigating the outlier request.

10. The apparatus of claim 9, wherein the first remedial action corresponds to a first distance that is longer than a second distance to which the second remedial action corresponds.

11. The apparatus of claim 8, wherein to determine the distance threshold, the program instructions direct the processing system to:
    determine a sensitivity level for the device; and
    determine the distance threshold based on the sensitivity level, wherein distance thresholds of the device-specific distance thresholds are shorter for higher sensitivity levels.

12. The apparatus of claim 8, wherein the program instructions direct the processing system to:
    select the tiered remedial actions from device-specific tiered remedial actions based on the device.

13. The apparatus of claim 12, wherein to select the tiered remedial actions, the program instructions direct the processing system to:
    determine a sensitivity level for the device; and
    determine the tiered remedial actions based on the sensitivity level.

14. The apparatus of claim 8, wherein grouping the DNS requests comprises:
    generate scores for the DNS requests from the characteristics; and
    group the DNS requests into the one or more groups based on the scores.

15. The apparatus of claim 14, wherein the distance comprises a difference between a score of the first DNS request and a score of a group of the one or more groups.

16. One or more non-transitory computer readable storage media having program instructions stored thereon, the program instructions, when read and executed by a processing system, direct the processing system to:
    group DNS requests into one or more groups based on characteristics of the DNS requests;
    identify an outlier request of the DNS requests, wherein the outlier request is one of the DNS requests that is not included in the one or more groups; and
    determine a device associated with the outlier request;
    determine a sensitivity level for the device;
    select tiered remedial actions for the outlier request from device-specific tiered remedial actions based on the device and the sensitivity level;
    determine a remedial action from the tiered remedial actions based on a distance of the outlier request to the one or more groups, wherein the tiered remedial actions correspond to different distances; and
    perform the remedial action.

17. The one or more non-transitory computer readable storage media of claim 16, wherein the tiered remedial actions include a first remedial action including blocking traffic associated with the outlier request and a second remedial action including investigating the outlier request.

18. A method comprising:
    generating scores for DNS requests from characteristics of the DNS requests;
    grouping the DNS requests into one or more groups based on the scores;
    identifying an outlier request of the DNS requests, wherein the outlier request is one of the DNS requests that is not included in the one or more groups;
    determining a remedial action from tiered remedial actions for the outlier request based on a score difference between a score of the outlier request and a score of a group of the one or more groups, wherein the tiered remedial actions correspond to different score differences; and
    performing the remedial action.

* * * * *